United States Patent
Pottenger et al.

(10) Patent No.: US 8,428,650 B2
(45) Date of Patent: Apr. 23, 2013

(54) RECONFIGURABLE BASE STATION USING MOBILE STATION RF ASIC

(75) Inventors: Warren T. Pottenger, Richardson, TX (US); Michael L. Brobston, Allen, TX (US); John A. Interrante, Richardson, TX (US); Lup M. Loh, Plano, TX (US); William M. Hurley, Wylie, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 732 days.

(21) Appl. No.: 11/078,808

(22) Filed: Mar. 11, 2005

(65) Prior Publication Data

US 2006/0052124 A1    Mar. 9, 2006

Related U.S. Application Data

(60) Provisional application No. 60/607,323, filed on Sep. 3, 2004.

(51) Int. Cl.
*H04M 3/00* (2006.01)
*H04B 1/38* (2006.01)

(52) U.S. Cl.
USPC .......... 455/561; 455/419; 455/552.1; 455/73; 455/553.1; 455/418; 375/219; 375/295; 375/316

(58) Field of Classification Search .................. 455/77, 455/84, 73, 349, 418–420, 450–452.2, 552.1, 455/553.1, 561; 370/310, 319, 343, 344, 370/400–404, 445, 464, 480; 379/219, 295, 379/316

See application file for complete search history.

(56) References Cited

U.S. PATENT DOCUMENTS

| | | | | |
|---|---|---|---|---|
| 6,025,758 | A * | 2/2000 | Lu ................................... | 332/100 |
| 6,072,994 | A * | 6/2000 | Phillips et al. ................... | 455/84 |
| 6,091,765 | A * | 7/2000 | Pietzold et al. ............... | 375/219 |
| 6,708,044 | B1 * | 3/2004 | Puknat et al. .............. | 455/552.1 |
| 6,903,606 | B1 * | 6/2005 | Yan et al. ........................... | 330/9 |
| 7,139,528 | B2 * | 11/2006 | Gambuzza ................... | 455/41.2 |
| 7,299,020 | B2 * | 11/2007 | Shen et al. ................. | 455/188.1 |
| 2003/0193923 | A1 * | 10/2003 | Abdelgany et al. ........... | 370/342 |
| 2004/0109474 | A1 * | 6/2004 | Koshino et al. ............... | 370/503 |
| 2005/0163232 | A1 * | 7/2005 | Norsworthy et al. ......... | 375/247 |

* cited by examiner

*Primary Examiner* — Matthew Sams

(57) ABSTRACT

A reconfigurable RF transceiver for use in either a base station or a mobile station Of a wireless network. The reconfigurable RF transceiver comprises a first receive path that down-converts an incoming RF signal to analog and digital baseband signals. The first receive path in a first mode down-converts the incoming RF signal in a receive frequency band for the base station and in a second mode down-converts the incoming RF signal in a receive frequency band for the mobile station. The reconfigurable RF transceiver further comprises a transmit path for up-converting an outgoing baseband signal to an outgoing RF signal. The transmit path in the first mode up-converts the outgoing baseband signal in a transmit frequency band for the base station and in the second mode up-converts the outgoing baseband signal in a transmit frequency band for the mobile station.

22 Claims, 3 Drawing Sheets

RECONFIGURABLE BASE STATION USING MOBILE STATION RF ASIC

CROSS-REFERENCE TO RELATED APPLICATIONS

The present invention is related to that disclosed in U.S. Provisional Patent Application Ser. No. 60/607,323, filed Sep. 3, 2004, entitled "Re-Configurable Small Office/Home Office (SOHO) BTS Using Handset RF ASIC". U.S. Provisional Patent Application Ser. No. 60/607,323 is assigned to the assignee of the present application. The subject matter disclosed in U.S. Provisional Patent Application Ser. No. 60/607,323 is hereby incorporated by reference into the present disclosure as if fully set forth herein. The present invention hereby claims priority under 35 U.S.C. §119(e) to U.S. Provisional Patent Application Ser. No. 60/607,323.

TECHNICAL FIELD OF THE INVENTION

The present invention relates generally to wireless networks and, more specifically, to base stations (or access points) and mobile stations that are implemented using the same RF ASIC devices.

BACKGROUND OF THE INVENTION

Improving coverage is an on-going endeavor of wireless service providers. To achieve ubiquitous coverage, service providers generally install more base stations or access points in a given geographical area. These base stations or access points (hereafter, collectively "base stations") often include micro-base stations (or pico-base stations) to provide localized area coverage or indoor coverage for common wireless standards such as CDMA2000-1x, WCDMA, and GSM. Micro/Pico-base stations are expected to play a significant role in future deployments of other standards (e.g., 802.16e) and in the development of fourth generation standards.

However, widespread deployment of micro-base stations and pico-base stations (hereafter, collectively "micro-base stations") is hindered by the relatively high costs associated with any type of wireless network infrastructure components, including base stations. Base stations are designed to meet more stringent RF requirements than mobile stations (also called "wireless terminals", "handsets", and the like). Moreover, the number of base stations (and other infrastructure components) that are manufactured is always much smaller than the number of mobile stations. This problem is further exacerbated by the use of different transceiver architectures to communicate according to different standards. The total number of base stations that are manufactured is subdivided into still smaller categories of base stations that operate under different standards (i.e., CDMA, GSM, etc.) Spreading the high design costs over the relatively low manufacturing volume means that base stations are much higher in price than mobile stations.

Thus, base stations for wide area networks (i.e., cell phone networks) often cost many tens of thousands (or even a few hundred thousand) dollars. Micro-base stations for small office-home office (SOHO) environments typically cost on the order of thousands of dollars each. As a result, micro-base stations have seen limited deployment in SOHO environments.

Base stations, including micro-base stations, are generally implemented using a mix of application specific integrated circuit (ASIC) devices and discrete components. Generally, the modem circuitry of the base transceiver subsystem (BTS) section in the base station is implemented via an ASIC or a field programmable gate array (FPGA). The remaining major functional blocks (e.g., network interface, radio transceiver, and radio frequency (RF) front-end, etc.) of the base station are implemented using discrete components.

The major impediments to the development of a low-cost base station include the cost of the RF transceiver, the cost of providing accurate timing references (e.g., GPS), particularly for CDMA and WCDMA, and the cost of backhaul networks. The state-of-the-art for micro-BTS systems (e.g., Samsung SpotBTS, Infomoble PicoBTS, Nokia Insite BTS, and the like) consists of multi-board assemblies. This includes multi-board assemblies even for a single carrier omni BTS, such as the InfoMobile PicoBTS. The prior art base stations also use discrete component implementations for the RF chains and unique hardware (NPU, CPU, modem, FEM) designs for each wireless standard and frequency band.

Currently, there is no single board implementation of a complete base station for the major mobile wireless standards (i.e., CDMA2000-1x, GSM, WCDMA, etc.). There are single board implementations for WLAN applications, such as 802.11a/b/g, but the architectures and devices used to implement 802.11x products cannot be adapted for use in mobile wireless standards. Development of an RF ASIC for each wireless standard is cost prohibitive and not cost competitive with equivalent mobile station solutions.

Therefore, there is a need in the art for an improved base station for use in a wireless network. In particular, there is a need for an improved micro-base station having a low-cost micro-BTS section for use in the small office-home office (SOHO) environment.

SUMMARY OF THE INVENTION

The present invention provides a multi-mode, multi-band micro-base station or access point (AP) that is implemented using the same re-configurable RF ASIC that is used in the mobile stations (or wireless terminals) that communicate with the micro-base station. With the development of re-configurable technologies for the network interface, modem processing, and radio transceiver, the possibility now exists that a small BTS may be implemented using 3 or 4 integrated circuits packages (ASIC, FGPA) rather than 3 or 4 circuit board assemblies. Key to this realization is the re-use without change by the base station of an RF ASIC developed for a mobile station (or wireless terminal). As a result, the pricing of the RF ASIC will reflect the manufacturing volume of the mobile stations rather than typical infrastructure level volume.

While the common RF ASIC is an important aspect of the present invention, the proposed BTS implementation incorporates other important features that make realization of a very low-cost, low-capacity BTS possible. These features include: i) BTS synchronization using IP packets, ii) a re-configurable modem, and iii) a re-configurable multi-band micro-electro-mechanical system (MEMS) front-end module.

The present invention overcomes the above-described shortcomings of the prior art by enabling a single board implementation of a low-capacity, low-cost BTS solution. By using a common RF ASIC for both mobile stations and base stations, the present invention enables the BTS to take advantage of the cost benefits of the high volume production of the mobile stations. The present invention also provides a single hardware platform that may be adapted to different standards. The applications of the present invention include: i) low-RF power, low-capacity base transceiver subsystems for CDMA2000-1x, WCDMA, GSM, 802.16e, and 4G; ii) digital repeaters for these standards; and iii) radio processing blades for high density base transceiver subsystems for these standards.

To address the above-discussed deficiencies of the prior art, it is a primary object of the present invention to provide, for use in a wireless network in which a base station accesses a mobile station, a reconfigurable radio frequency (RF) transceiver capable of being adapted for use in both the base station and the mobile station. According to an advantageous embodiment of the present invention, the reconfigurable RF transceiver comprises a first receive path capable of receiving an incoming RF signal and down-converting the incoming RF signal to at least one of an analog baseband signal and a digital baseband signal. The first receive path in a first mode down-converts the incoming RF signal in a receive frequency band associated with the base station and in a second mode down-converts the incoming RF signal in a receive frequency band associated with the mobile station. The reconfigurable RF transceiver further comprises a transmit path capable of receiving an outgoing baseband signal and up-converting the outgoing baseband signal to an outgoing RF signal, wherein the transmit path in the first mode up-converts the outgoing baseband signal in a transmit frequency band associated with the base station and in the second mode up-converts the outgoing baseband signal in a transmit frequency band associated with the mobile station.

According to one embodiment of the present invention, the reconfigurable RF transceiver further comprises a second receive path capable of receiving an incoming RF signal and down-converting the incoming RF signal to at least one of an analog baseband signal and a digital baseband signal, wherein the second receive path in the first mode down-converts the incoming RF signal in the receive frequency band associated with the base station and in the second mode down-converts the incoming RF signal in the receive frequency band associated with the mobile station, and wherein the second receive path comprises a diversity receive path with respect to the first receive path.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
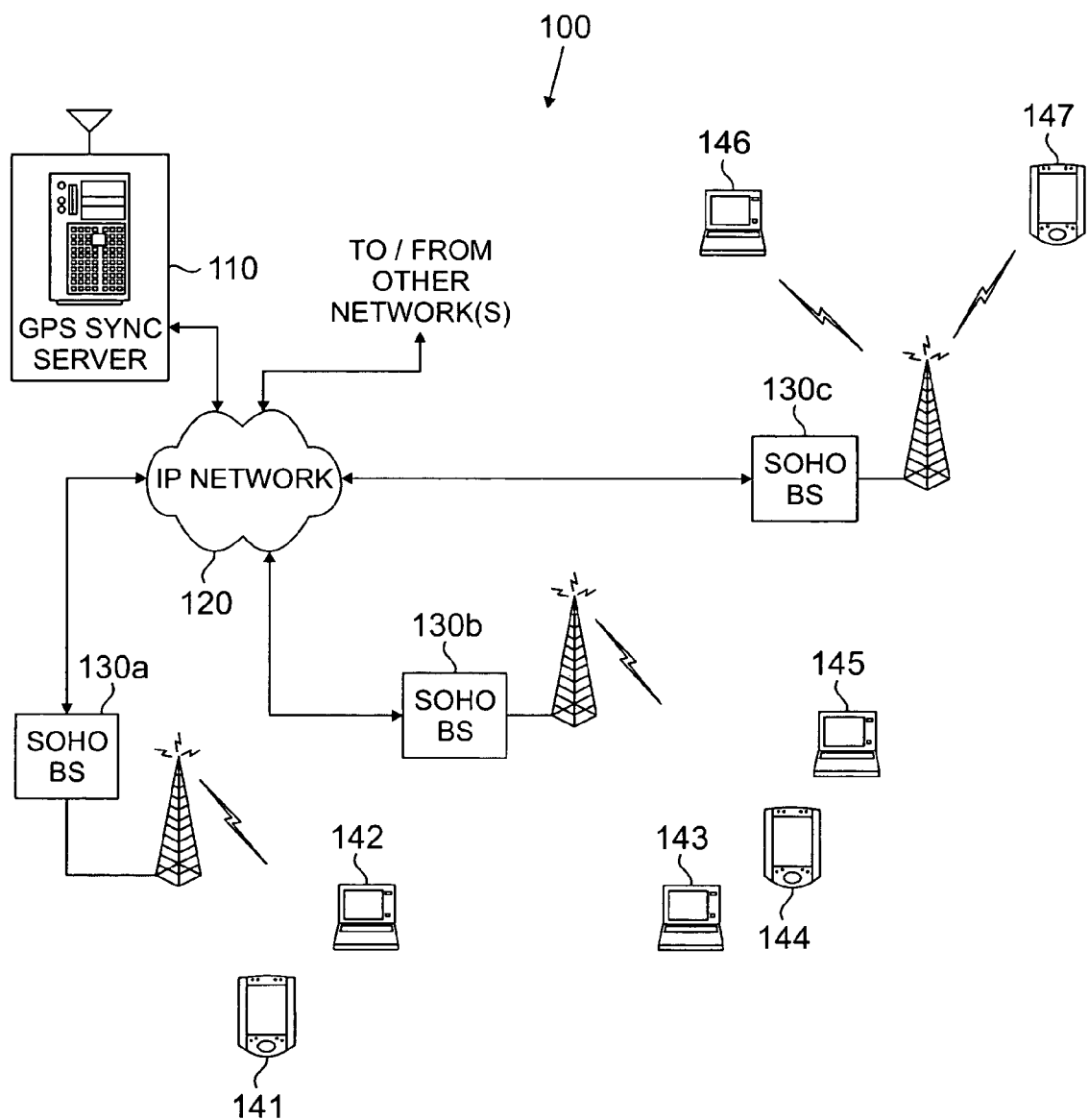
FIG. 1 illustrates a wireless network comprising base transceiver subsystems that are implemented using reconfigurable RF transceivers according to the principles of the present invention.
Figure 2:
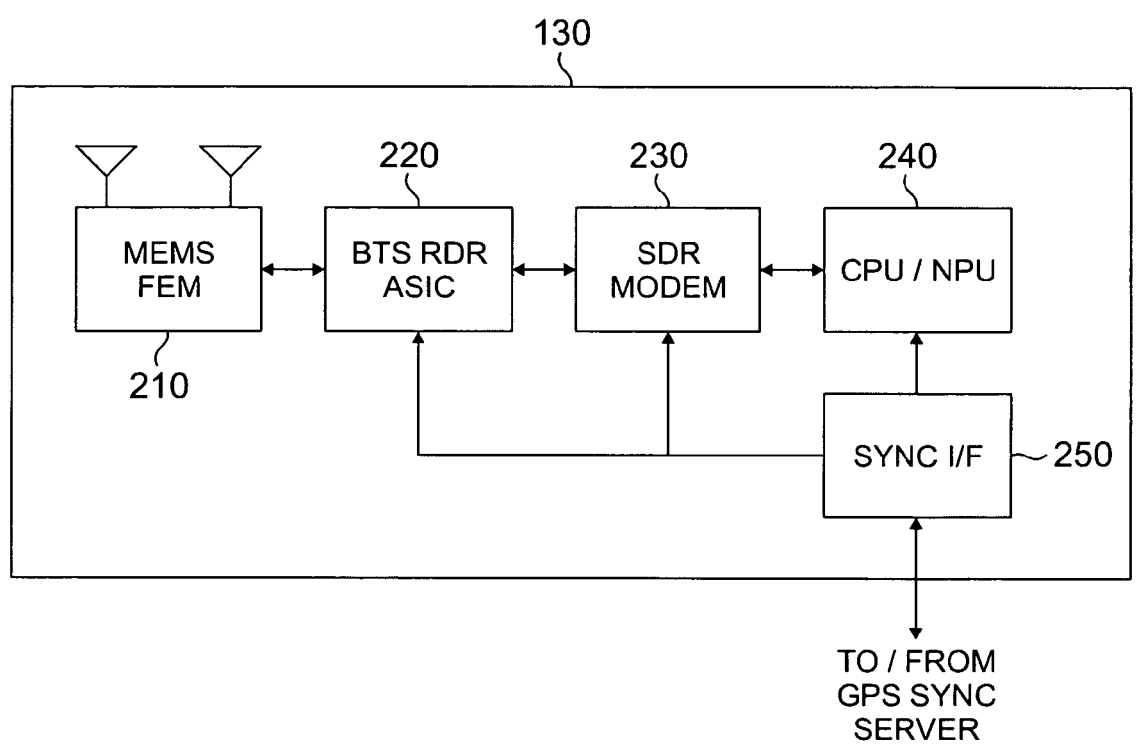
FIG. 2 is a high level block diagram of the base transceiver subsystem (BTS) section of the base stations in FIG. 1 according to an exemplary embodiment of the present invention.
Figure 3:
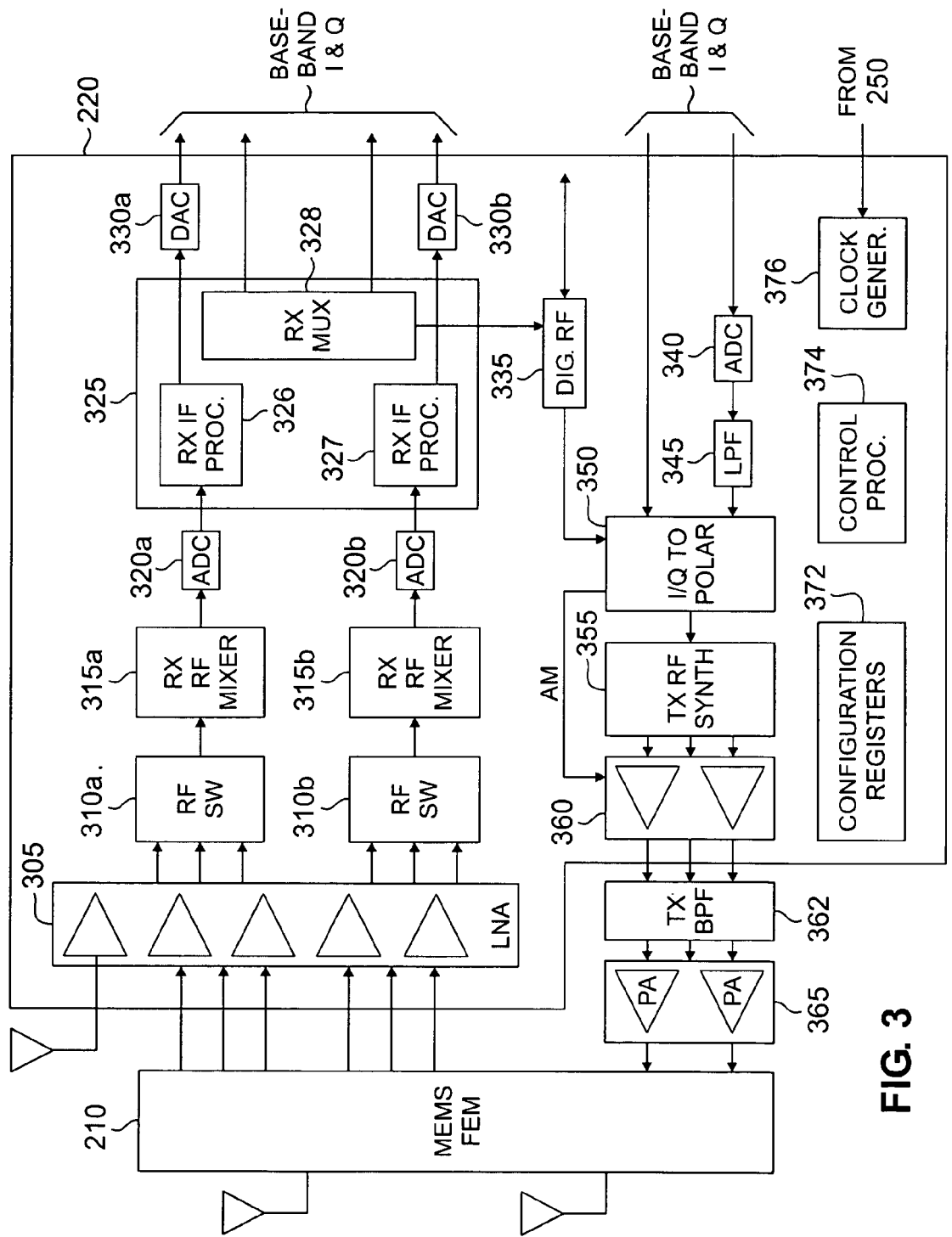
FIG. 3 illustrates a reconfigurable digital radio RF integrated circuit according to an exemplary embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged radio frequency transceiver.

FIG. 1 illustrates wireless network 100, which comprises base transceiver subsystems that are implemented using reconfigurable RF transceivers according to the principles of the present invention. Wireless network 100 comprises a plurality of base stations (or access points) 130, including exemplary base stations 130a, 130b, and 130c that communicate with a plurality of mobile stations (or wireless terminals), including exemplary mobile stations 141-147. Wireless network 100 also comprises Internet Protocol (IP) network 120, which may be, for example, the Internet or a proprietary wide area network (WAN). IP network 120 enables base stations 130a-c to communicate with GPS synchronization server 110 and other networks.

The present invention is not limited to use with true mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

According to the exemplary embodiment of the present invention, base stations 130a-c are implemented in small office-home office (SOHO) environments in which base stations 130a-c communicate over relatively short distances with mobile stations. For example, base station 130a may be implemented in an office environment to provide wireless access for mobile stations 141 and 142. Similarly, base station 130b may be implemented in a retail location to provide wireless access for mobile stations 143-145. Finally, base station 130c may be implemented in a residence to provide wireless access for mobile stations 146 and 147.

FIG. 2 is a high level block diagram of the base transceiver subsystem (BTS) section of base stations 130 according to an exemplary embodiment of the present invention. Exemplary base station 130 comprises micro-electromechanical system (MEMS) front-end module (FEM) 210 and base transceiver subsystem (BTS) reconfigurable digital radio (RDR) application specific integrated circuit (ASIC) 220. Base station 130 further comprises software defined radio (SDR) modem 230, central processing unit/network processing unit (CPU/NPU) 240 and synchronization (Sync.) interface (IF) 250.

MEMS FEM 210 comprises MEMS technology that integrates of components in the radio frequency (RF) front-end (e.g., switches, filters, duplexers) of the base station/access point. MEMS technology has only recently been introduced to wireless handsets and other mobile stations as a way to significantly reduce the RF component count and cost. The same benefits may be realized in small, low-power base stations. Using MEMS technology in the RF front-end reduces into a single device the array of RF switches, filters, and duplexer circuits needed to support multiple modes (i.e., CDMA, GSM, IEEE-802.16x) and multiple frequency bands.

BTS RDR ASIC 220 comprises a single, low-cost CMOS device that includes reconfigurable low-noise amplifiers (LNAs), a wideband receiver chain (including a quadrature mixer and a digital synthesizer), a digital receiver (RX) filtering chain, and a full transmit (TX) chain incorporating polar transmitter techniques. BTS RDR ASIC 220 is illustrated in FIG. 3 and explained below in greater detail. BTS RDR ASIC 220 is fully reconfigurable to support multiple modes and multiple frequency bands, thereby allowing the use of a single low-cost device to satisfy the many different requirements of a multi-mode, multi-band base station (or access point).

SDR modem 230 comprises software-defined baseband processing engines that lower manufacturing cost and deployment costs by allowing the baseband processing configuration to be downloaded at the time of use, rather than hardwired at the time of design or manufacturing. This allows a single product to be useful in many different applications. BTS RDR ASIC 220 also may be easily upgraded in the field to accommodate changes to standards. Rapid advances in technology and standards generally outpace development cycles and operators are hesitant to replace wireless infrastructure every few years just to keep up with the advancement of these standards. Incorporating a software-defined modem into base station 130 gives operators confidence that their infrastructure will survive for a number of generations before needing replacement.

Synchronization I/F (interface) 250 provides precise synchronization over packet networks, thereby eliminating significant cost and complexity from base station 130. Synchronization I/F 250 receives highly accurate timing signals from GPS synchronization server 110. Synchronization I/F 250 recovers a clock signal from IP packets received from GPS synchronization server 110. Synchronization I/F 250 then generates and distributes very accurate internal clock signals to BTS RDR ASIC 220, SDR modem 230, and CPU/NPU 240. Legacy methods that force costly GPS receivers and antennas into each node or require complex distribution schemes are no longer needed.

CPU/NPU 240 integrates network processor unit (NPU) functions and central processor unit (CPU) functions onto the same silicon in order to handle data plane processing and control plane processing. Using an integrated NPU/CPU for all of the data, control, and management plane tasks allows the network interface and base station functions to be fully configurable. Thus, base station 130 is capable of operating as a small BTS that interfaces to a conventional base station controller (not shown) of a wireless network. In this way, base station 130 may provide cost-effective spot coverage in an existing cell site. Base station 130 can also be reconfigured to operate as a stand-alone access point for SOHO use.

FIG. 3 illustrates BTS RDR ASIC 220 in greater detail according to an exemplary embodiment of the present invention. BTS RDR ASIC 220 comprises low-noise amplifier (LNA) block 305, radio-frequency switches (RF SW) 310a and 310b, receive (RX) RF mixers 315a and 315b, analog-to-digital converters (ADCs) 320a and 320b, and digital intermediate frequency (IF) block 325, and digital-to-analog converters (DACs) 330a and 330b. Digital IF block 325 comprises receive IF processor 326, receive IF processor 327, and receive (RX) multiplexer (MUX) 328. BTS RDR ASIC 220 further comprises digital RF interface block 335, ADC 340, low-pass filter (LPF) 345, I/Q-to-polar block 350, transmit RF synthesizer 355, pre-amplifier block 360, configuration registers 372, control processor 374, and clock generator 376.

The operation of BTS RDR ASIC 220 is controlled by control processor 374 and configuration registers. The behavior of BTS RDR ASIC 220 may be adapted to different standards and frequency bands by storing configuration parameters in a plurality of configuration registers 372. An external controller may write configuration parameters directly to configuration registers 372. Alternatively, an external controller may indirectly write configuration parameters by sending the configuration parameters to control processor 374, which subsequently writes the control parameters to configuration registers 372.

BTS RDR ASIC 220 comprises two receive paths. A first receive path includes RF switch 310a, receive RF mixer 315a, ADC 320a and receive IF processor 325. A second receive path includes RF switch 310b, receive RF mixer 315b, ADC 320b and receive IF processor 327. The use of two receive paths allows single antenna reception or diversity reception. BTS RDR ASIC 220 interfaces with transmit bandpass filter (TX BPF) 362, power amplifier block 365 and a duplexer in MEMS FEM 210. The other side of BTS RDR ASIC 220 sends baseband signals to, and receives baseband signal from, SDR modem 230.

LNA block 305 comprises a plurality of low-noise amplifiers that are optimized for different standards and frequency bands. The low-noise amplifiers in LNA block 305 receive incoming RF signals from the duplexer in MEMS FEM 210 (or directly from an antenna. Multiple low-noise amplifiers are used in order to achieve the best noise figure for each frequency band. However, this has little impact on the total silicon area, since the area of each LNA is quite small. Also, unused low-noise amplifiers are simply powered down to minimize power consumption.

The amplified outputs of the selected LNA are applied to RF switches 310a and 310b and are switched into one or both of the receive paths. The receiver sections following the low-noise amplifiers are common receiver blocks that are adapted to each frequency band and radio standard by reconfiguring the parameters in configuration registers 372.

Receive RF mixers 315a and 315b down-convert to intermediate frequency (IF) signals the amplified RF output signals from the LNA block 305 selected by RF switches 310a and 310b. The RF-IF down-conversion functions include quadrature mixing of the received signal using a wideband mixer to cover multiple bands. An integrated wideband digital synthesizer generates the local oscillator with exceptionally low phase noise. The operation of receive RF mixers 315a and 315b are adapted to each frequency band and radio standard by reconfiguring the parameters in configuration registers 372.

ADC 320a and ADC 320b comprise reconfigurable delta-sigma analog-to-digital converters. ADC 320a and ADC 320b sample the IF signals from receive RF mixers 315a and 315b. The delta-sigma loop parameters and other parameters of ADC 320a and ADC 320b are adapted to each frequency band and radio standard by reconfiguring the parameters in configuration registers 372. By setting the delta-sigma loop parameters based on the signal bandwidth, the noise transfer function of ADC 320 is tailored for each standard waveform to provide the optimal signal-to-noise ratio (SNR).

Following ADC 320a and ADC 320b, digital complex mixing provides a nearly ideal complex demodulation function in the receiver that may support zero IF operation, very low-frequency digital IF, or classical digital IF operation.

The digital baseband filters in receive IF processors 326 and 327 are implemented as a combination of CIC and FIR filters interspersed with integer decimations and interpolations to perform narrowband channel selection, image rejection, and pulse shaping in either perfectly phase linear or phase equalizing configurations. As before, the operation of receive IF processors 326 and 327 and receiver MUX 328 are adapted to each frequency band and radio standard by reconfiguring the parameters in configuration registers 372.

The digital filters can be easily reconfigured in terms of number of taps and coefficients in order to optimize the channel filtering performance for a given standard. In addition, the digital filters are capable of performing the complete level of channel filtering required to meet the demanding standard measurements of receiver single tone desensitization and adjacent channel interference without the use of analog IF channel filtering. This allows the IF blocks to be designed with a wideband response so that multiple modulation formats can be supported through a common analog IF path.

Fixed digital gain is another feature of digital IF block 325. Signal gain is very easy to achieve digitally and requires very little power. Digital gain is also perfectly accurate and non-varying and is not susceptible to instability due to undesirable feedback. By allocating much of the system gain into digital IF block 325, this reduces the gain required from the RF and analog IF sections.

DAC 330a and DAC 330b perform a non-integer re-sampling function that is an important final step after multi-standard digital IF block 325. Since ADC 320 and DAC 330 perform best when clocked with a low jitter clock, a fixed-frequency sample clock is essential. Therefore, a non-integer re-sampler is used to present data to a modem at different sample rates for different standards while still allowing a fixed sample rate on the analog IF. The non-integer re-sampler is advantageous, since the required baseband sample rate will not always be achievable with integer decimations from the IF sample rate.

At the end of the receive paths, either digital baseband outputs from receive MUX 328 are presented to a digital modem in SDR modem block 230 or analog baseband outputs from DAC 330a and DAC 330b are presented to an analog modem in SDR modem block 230. Receive IF processors 326 and 327 include a flexible baseband interface that adapts to multiple modem devices. The flexible interface include both analog and digital data interfaces, digital baseband data formatting to convert between 2s-complement data and offset binary, I/Q inversion, and other features that enable adaptation to different modem data formats.

The transmit path of BTS RDR ASIC 220 include ADC 340, LPF 345, I/Q-to-polar block 350, transmit RF synthesizer 355, and pre-amplifiers 360. I/Q-to-polar block 350 converts the I and Q data to polar format. Transmit RF synthesizer 355 comprises a broadband direct modulator capable of supporting modulation requirements of any of the supported standards. The baseband interface to SDR modem block 230 supports both analog data (via ADC 340 and LPF 345) and digital data to provide a flexible interface to accommodate multiple modem devices. Digital RF interface block 335 provides serial digital functions plus a GMSK modulator function. The analog signals from the analog interface are converted to digital by ADC 340 and then digitally filtered and pulse shaped by LPF 345 prior to be supplied to transmit modulator 350.

Transmit RF synthesizer 355 up-converts the baseband data using a local oscillator signal supplied from a digitally controlled oscillator (DCO). The DCO has broadband capability to support over an octave of frequency coverage with fine carrier frequency resolution. After the final up-conversion to an RF signal by transmit RF synthesizer 355, the RF signal is branched into multiple amplifier driver paths in pre-amplifier block 360 to support multiple external power amplifiers in power amplifier block 365. Since the power amplifier matching is optimized for specific frequency bands, individual outputs are provided to multiple power amplifiers. In an exemplary embodiment of the present invention, digital polar modulation directly in the power amplifier may be used.

By modifying the parameters in configuration registers 372, BTS RDR ASIC 220 may be configured for processing either base station frequency bands or mobile station frequency bands. Thus, BTS RDR ASIC 220 may be implemented in either base stations or mobile stations. Exemplary frequency bands include 800 MHz, 900 MHz, 1800 MHz, 1900 MHz, and 2100 MHz. In an exemplary embodiment, BTS RDR ASIC 220 may be configured to support one or more of GSM, GPRS, CDMA, WCDMA, and GPS.

Although the present invention has been described with an exemplary embodiment, various changes and modifications may be suggested to one skilled in the art. It is intended that the present invention encompass such changes and modifications as fall within the scope of the appended claims.

What is claimed is:

1. A reconfigurable radio frequency (RF) transceiver, for use in a micro-base station and configured for low cost and low power consumption, the reconfigurable RF transceiver comprising:

a duplexer configured to receive an incoming RF signal in a selectable receive frequency band and to transmit an outgoing RF signal in a selectable transmit frequency band;

a first receive path in an application-specific integrated circuit (ASIC) coupled to the duplexer, the first receive path configured to receive the incoming RF signal in a selectable receive frequency band and to down-convert the incoming RF signal to at least one of an analog baseband signal and a digital baseband signal;

a transmit path in the ASIC, the transmit path configured to receive the outgoing baseband signal and to up-convert the outgoing baseband signal to an outgoing RF signal in a selectable transmit frequency band, wherein the transmit path is also configured to receive a signal from a digital RF interface block that comprises at least one serial digital function and at least one Gaussian Minimum Shift Key (GMSK) modulator;

a plurality of configuration registers in the ASIC, each configuration register configured to store at least one modifiable configuration parameter, wherein the modifiable configuration parameters configure at least one multiplexer receiver and one intermediate frequency processor, wherein the modifiable configuration parameters are used to promote communication with a plurality of frequency bands and communication standards;

a plurality of low-noise amplifiers (LNAs) in the ASIC and coupled to the duplexer, at least some of the LNAs designed for different frequency bands and communication standards, wherein unused LNAs are configured to be powered down to minimize power consumption; and an integrated central processing unit/network processing unit (CPU/NPU) configured to use the modifiable configuration parameters to handle data plane processing, management plane processing, to control panel plane processing, and to allow the RF transceiver to be fully reconfigured at a time of use.

2. The reconfigurable radio frequency (RF) transceiver as set forth in claim 1, further comprising:

a second receive path in the ASIC, the second receive path configured to receive an incoming RF signal in the selectable receive frequency band and to down-convert the incoming RF signal to at least one of an analog baseband signal and a digital baseband signal, wherein the second receive path comprises a diversity receive path with respect to the first receive path.

3. The reconfigurable radio frequency (RF) transceiver as set forth in claim 1, wherein, for a first mode of the transceiver, the selectable receive frequency band is one of a plurality of receive frequency bands associated with a base station.

4. The reconfigurable radio frequency (RF) transceiver as set forth in claim 3, wherein, for a second mode of the transceiver, the selectable receive frequency band is one of a plurality of receive frequency bands associated with a mobile station.

5. The reconfigurable radio frequency (RF) transceiver as set forth in claim 4, wherein the first receive path is further configured to down-convert the incoming RF signal according to a selectable modulation scheme associated with the base station in the first mode, wherein the selectable modulation scheme is selected based on the modifiable configuration parameters.

6. The reconfigurable radio frequency (RF) transceiver as set forth in claim 5, wherein, for the first mode, selectable modulation scheme is one of a plurality of modulation schemes associated with the base station.

7. The reconfigurable radio frequency (RF) transceiver as set forth in claim 5, wherein the first receive path is further configured to down-convert the incoming RF signal according to a selectable modulation scheme associated with the mobile station in the second mode, wherein the selectable modulation scheme is selected based on the modifiable configuration parameters.

8. The reconfigurable radio frequency (RF) transceiver as set forth in claim 7, wherein, for the second mode, the selectable modulation scheme is one of a plurality of modulation schemes associated with the mobile station.

9. The reconfigurable radio frequency (RF) transceiver as set forth in claim 1, wherein, for a first mode of the transceiver, the selectable transmit frequency band is one of a plurality of transmit frequency bands associated with a base station and, for a second mode of the transceiver, the selectable transmit frequency band is one of a plurality of transmit frequency bands associated with a mobile station.

10. The reconfigurable radio frequency (RF) transceiver as set forth in claim 9, wherein the transmit path is further configured to up-convert the outgoing baseband signal according to a plurality of selectable modulation schemes associated with the base station in the first mode and to up-convert the outgoing baseband signal according to a plurality of selectable modulation schemes associated with the mobile station in the second mode.

11. The reconfigurable radio frequency (RF) transceiver as set forth in claim 1, the first receive path comprising:

a receive RF mixer configured to down-convert RF signals to intermediate frequency (IF) signals; and a reconfigurable delta-sigma analog-to-digital converter configured to sample the IF signals based on delta-sigma loop parameters, wherein the modifiable configuration parameters adapt both (i) operation of the receive RF mixer and (ii) the delta-sigma loop parameters to the selectable receive frequency band.

12. A multi-mode, multi-band radio frequency (RF) transceiver, for use in at least one of a micro-base station and a mobile station of a wireless network and configured for low cost and low power consumption, the multi-mode, multi-band radio frequency (RF) transceiver comprising:

a micro-electromechanical system duplexer configured to receive an incoming RF signal in a selectable receive frequency band and to transmit an outgoing RF signal in a selectable transmit frequency band;

a reconfigurable RF transceiver application-specific integrated circuit (ASIC) comprising:

a first receive path configured to receive the incoming RF signal from the micro-electromechanical system duplexer and to down-convert the incoming RF signal to at least one of an analog baseband signal and a digital baseband signal, a transmit path configured to receive an outgoing baseband signal and to up-convert the outgoing baseband signal to the outgoing RF signal, wherein the transmit path is also configured to receive a signal from a digital RF interface block that comprises at least one serial digital function and at least one Gaussian Minimum Shift Key (GMSK) modulator, and a plurality of configuration registers, each configuration register configured to store at least one modifiable configuration parameter, wherein each modifiable configuration parameter configures at least one multiplexer receiver and one intermediate frequency processor, and wherein the modifiable configuration parameters are used to promote communication with a plurality of frequency bands and communication standards, wherein the reconfigurable registers are configured to reconfigure the RF transceiver at a time of use, and a plurality of low-noise amplifiers (LNAs) coupled to the duplexer, at least some of the LNAs designed for different frequency bands and communication standards, wherein unused LNAs are configured to be powered down to minimize power consumption;

a software-defined radio modem coupled to the ASIC and configured to transmit the outgoing baseband signal to the ASIC and to receive the at least one of the analog baseband signal and the digital baseband signal from the ASIC; and an integrated central processing unit/network processing unit (CPU/NPU) configured to use the modifiable configuration parameters to handle data plane processing, management plane processing and control panel plane processing.

13. The multi-mode, multi-band radio frequency (RF) transceiver as set forth in claim 12, the ASIC further comprising:

a second receive path configured to receive an incoming RF signal in the selectable receive frequency band and to down-convert the incoming RF signal to at least one of an analog baseband signal and a digital baseband signal, wherein the second receive path comprises a diversity receive path with respect to the first receive path.

14. The multi-mode, multi-band radio frequency (RF) transceiver as set forth in claim 12, wherein, for a first mode of the transceiver, the selectable receive frequency band is one of a plurality of receive frequency bands associated with a base station.

15. The multi-mode, multi-band radio frequency (RF) transceiver as set forth in claim 14, wherein, for a second mode of the transceiver, the selectable receive frequency band is one of a plurality of receive frequency bands associated with the mobile station.

16. The multi-mode, multi-band radio frequency (RF) transceiver as set forth in claim 15, wherein the first receive path is further configured to down-convert the incoming RF signal according to a selectable modulation scheme associated with the base station in the first mode, wherein the selectable modulation scheme is selected based on the modifiable configuration parameters.

17. The multi-mode, multi-band radio frequency (RF) transceiver as set forth in claim 16, wherein, for the first mode, the selectable modulation scheme is one of a plurality of modulation schemes associated with the base station.

18. The multi-mode, multi-band radio frequency (RF) transceiver as set forth in claim 16, wherein the first receive path is further configured to down-convert the incoming RF signal according to a selectable modulation scheme associated with the mobile station in the second mode, wherein the selectable modulation scheme is selected based on the modifiable configuration parameters.

19. The multi-mode, multi-band radio frequency (RF) transceiver as set forth in claim 18, wherein, for the second mode, the selectable modulation scheme is one of a plurality of modulation schemes associated with the mobile station.

20. The multi-mode, multi-band radio frequency (RF) transceiver as set forth in claim 12, wherein, for a first mode of the transceiver, the selectable transmit frequency band is one of a plurality of transmit frequency bands associated with the base station and, for a second mode of the transceiver, the selectable transmit frequency band is one of a plurality of transmit frequency bands associated with the mobile station.

21. The multi-mode, multi-band radio frequency (RF) transceiver as set forth in claim 20, wherein the transmit path is further configured to up-convert the outgoing baseband signal according to a plurality of selectable modulation schemes associated with the base station in the first mode and to up-convert the outgoing baseband signal according to a plurality of selectable modulation schemes associated with the mobile station in the second mode.

22. The multi-mode, multi-band radio frequency (RF) transceiver as set forth in claim 12, the first receive path comprising:
a receive RF mixer configured to down-convert RF signals to intermediate frequency (IF) signals; and
a reconfigurable delta-sigma analog-to-digital converter configured to sample the IF signals based on delta-sigma loop parameters, wherein the modifiable configuration parameters adapt both (i) operation of the receive RF mixer and (ii) the delta-sigma loop parameters to the selectable receive frequency band.

* * * * *